Sept. 11, 1934.   E. S. CORNELL, JR   1,972,872
ADAPTER
Filed Jan. 16, 1932
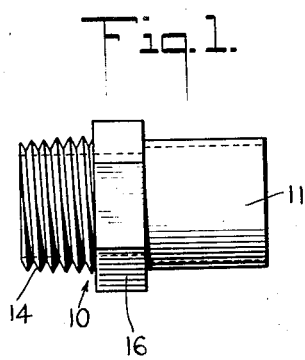
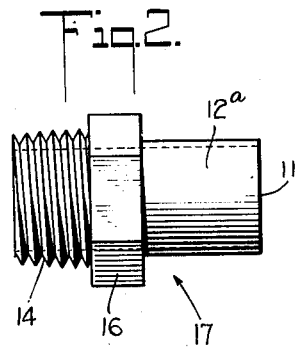
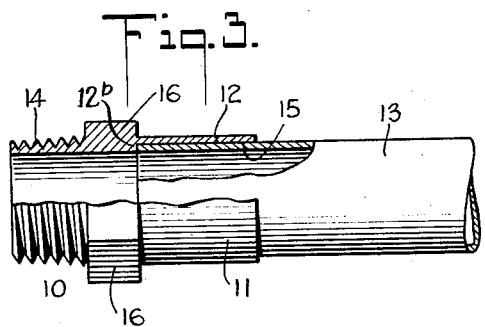
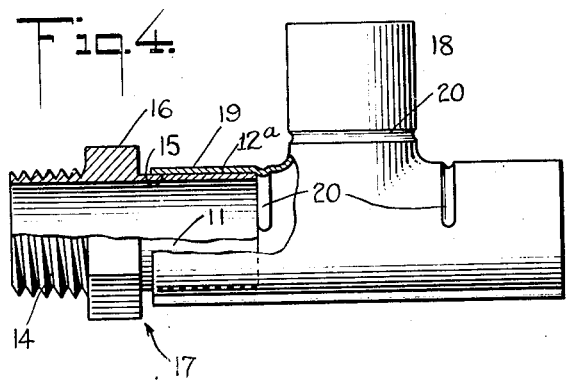
INVENTOR,
EDWARD S. CORNELL, JR.
BY
Henry J. Locke
HIS ATTORNEY

UNITED STATES PATENT OFFICE 1,972,872

ADAPTER

Edward S. Cornell, Jr., Larchmont, N. Y.

Application January 16, 1932, Serial No. 586,982

1 Claim. (Cl. 285—203)

My invention relates to adapters.

More particularly my invention relates to adapters of male and female types arranged for connection with ends of pipe or pipe fittings by sweat connection, that is to say, by bonding effected by congealing a suitable fusible bonding medium.

More particularly, adapters embodying my invention comprise an end portion which is provided with threading for connection with a correspondingly threaded faucet or other suitable threaded device, the opposite end of the adapter being smooth either interiorly or exteriorly for connection telescopically with an end of a pipe, or a pipe fitting or the like, the clearance in telescope relation being of suitably reduced dimension to provide for capillary or other surface flow of a suitable bonding medium when heated during the stage of assembly.

Further features and objects of the invention will be more fully understood from the following detail description and the accompanying drawing, in which Fig. 1 is a side elevation of an adapter embodying my invention, the same being of the female type, that is to say, the inner face of its pipe connecting end being smooth for female telescoped connection with the pipe end;

Fig. 2 is a side elevation of a male type of adapter embodying my invention, the outer face of its end for connection with a pipe fitting or the like, being smooth, for similar purposes;

Fig. 3 is a side elevation, partly broken away in section, showing the combination of a pipe end with the female type of adapter shown in Fig. 1; and Fig. 4 is a side elevation, partly broken away, showing the combination of a male type of adapter, as in Fig. 2, connected with the end of the pipe fitting, such as a T.

Referring to Figs. 1 and 3, the female adapter 10 comprises the sweat connection end 11, in this instance, the inner face 12 of its female connection being smooth and of substantially uniform diameter throughout, for connection with any suitable end such as the end of a pipe 13, or the like. The connection between the inner connecting face of the female adapter 10 is had by dimensioning the clearance, i. e., the inner diameter of the smooth connection face 12 and the outer diameter of the pipe 13 or the like, of such reduced dimensional relationship whereby solder, or brazing material, or other suitable bonding medium when in fluid state readily flows by capillary and/or surface flow substantially completely about and between the respective inner face 12 of the adapter 10 and the outer telescoped portion of the pipe end 13, and upon congealing of the bonding medium, the joint is mechanically interconnected and sealed against fluid leakage.

As is illustrated in Fig. 3, the abutment 12b is provided at the inner terminus of the smooth and uniformly diametered face 12, to limit the extent of insertion of the end of a pipe or pipe fitting. Upon insertion of the pipe end to the extent determined by the abutment 12b, the area of the resulting telescoped sweat connection, predetermined for the respective sizes of pipes and fittings, affords a jointed connection of proper rigidity to provide a sealed joint, proof against twisting, lateral and other externally applied stresses.

In effecting the sweat connection, the telescoped portions of the connecting end 11 of the adapter and the pipe end 13 are heated by a torch or other suitable heating medium, and upon being raised to a desired elevated temperature, the juxtaposed parts are brought into telescoped relation, a bar or strip of the solder or other bonding medium being applied to the clearance between the telescoped ends, with or without the use of a brush to facilitate initial flowing of the bonding medium at the exposed end of the clearance; upon cooling either in the air or by means of applied cooling water the bonding medium effects a sealed joint.

The end 14 of the adapter is threaded for connection with a correspondingly threaded faucet or other suitable threaded device.

Preferably, the adapter is provided with the polygonal contour portion 16, usually hexagonal, for application of a wrench or the like, for rotating or holding the adapter when connecting the threaded device.

The adapter 17 of the male type, shown in Fig. 2, is illustrated in Fig. 4, as connected with an end of a T 18, the construction of the T corresponding to that set forth in my co-pending application Ser. #555,032, and in my granted U. S. Patent #1,850,049, patented March 15th, 1932.

The parts of the adapter shown in Figs. 2 and 4 correspond to like parts of the adapter shown in Figs. 1 and 3 and corresponding parts are marked by like reference characters; the outer face of the connecting end is indicated 12a.

The adapter illustrated in Fig. 4, similarly as in Fig. 2, is of the male type, and the outer face of its connecting end portion 11 is smooth and of substantially uniform diameter throughout, the outer diameter being as compared with the inner diameter of the end portion 19 of the T 18 of a range to provide for capillary action or surface flow action of solder or brazing material or other suitable bonding material.

Preferably, the end of a pipe fitting such as the end 19 of the T 18 is provided with a bead 20 or equivalent, serving as a stop to limit the extent of insertion of the telescoped connecting end 11 of the adapter, the length of the telescoped smooth end 11 being commensurate with the length of insertion limited by the bead or other stop 20. Preferably, the telescoped extent of insertion is made standard, and similar beads or like insertion limiting means 20 are employed in the neck and opposite ends of the T 18, and likewise in other pipe fittings of this character.

My adapters may be made of castings of copper, brass and other copper containing alloys and other suitable metallic material, and machined as required.

As is shown in the drawing, in connection with the herein disclosure, and as is set forth in my aforesaid co-pending application Serial No. 555,032, and in my co-pending application Serial No. 584,021, filed December 31st, 1931, now U. S. Patent No. 1,949,197, granted February 27, 1934, the wall thickness of the smooth end of each adapter embodying my present invention, is preferably insufficient for forming threading thereon, such wall thickness, however, being of a magnitude to provide sufficient strength against puncture or other rupture.

Whereas I have described my invention by reference to specific forms thereof, it will be understood that many changes and modifications may be made without departing from the spirit of the invention.

I claim:

As a new article of manufacture for coupling a pipe or pipe fitting having an unthreaded end to a faucet or other device having a threaded end, an adapter having an end provided with threading for threaded connection with the threaded end of a faucet or other threaded device, the opposite end of said adapter being smooth, the wall thickness of said opposite end of the adapter being insufficient for bearing threads thereon, and adapted to receive the unthreaded end of a thin walled pipe or pipe fitting either interiorly or exteriorly thereof and to have the end of said thin walled pipe or pipe fitting secured thereto by a sweated joint.

EDWARD S. CORNELL, Jr.